United States Patent Office 3,159,167
Patented Dec. 1, 1964

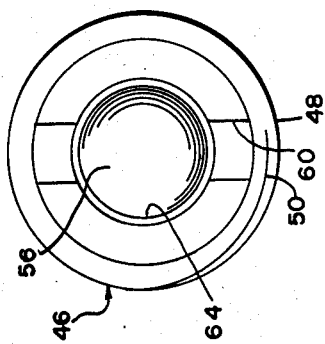
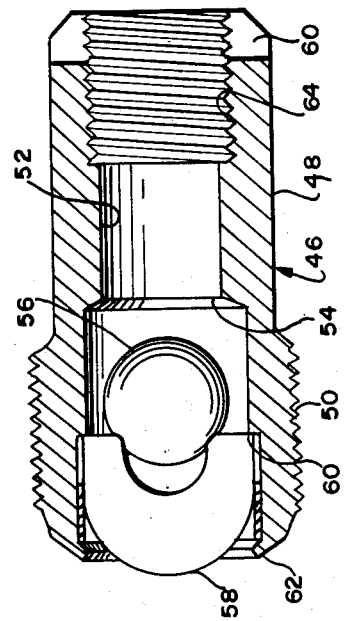

3,159,167
SERVICE T INSTALLATION INCLUDING
EXCESSIVE-FLOW SAFETY VALVE
Frank H. Mueller, Wilbur R. Leopold, Jr., and Lawrence F. Luckenbill, Decatur, Ill., assignors to Mueller Co., Decatur, Ill., a corporation of Illinois
Filed Nov. 15, 1961, Ser. No. 152,508
5 Claims. (Cl. 137—71)

This invention relates to improvements in service T's used to connect a street main with a service line to supply a dwelling with gas or water. More especially, this invention relates to improvements in service T's which will prevent escape of fluid from the main to the atmosphere in case the service T is broken off by excavating operations, or in the event of excessive flow through the T for any reason, as for example, rupture of the service line.

Service T's normally are buried underground, but occasionally access must be had thereto, by excavating operations, for repair or replacement purposes. Additionally, excavations frequently are made in the neighborhood of service T's for a multitude of reasons, such as to provide access to other nearby underground conduits or cables. In the course of such excavating operations, a service T occasionally is inadvertently struck a fracturing blow. In the event that the T is used to supply gas to a dwelling, the consequent escape of gas to the atmosphere creates an extremely hazardous situation. Even if the T is supplying only water, the resulting escape of water creates a most troublesome situation.

Not only are service T's themselves occasionally broken off by excavating operations, but also a service line may be inadvertently ruptured by such operations. Additionally, situations occasionally develop in a dwelling itself which result in an undesirable excessive escape of gas to the atmosphere. Again, any excessive escape of gas, whether from a service line or house piping, creates a hazardous situation.

Accordingly, it is an object of this invention to provide an improved service T which, if fractured off, will automatically shut off flow of fluid from the main to the atmosphere.

It is another object of this invention to provide an improved service T which accomplishes the foregoing object by adaptations of an excessive-flow safety valve of the type disclosed in the patent to Jerman No. 2,569,316.

It is a further object of this invention to provide an improved service T which will operate to shut off flow therethrough whenever such flow becomes excessive for any reason.

Other objects and advantages of the invention will become apparent from the following description and accompanying drawings in which:

FIGURE 1 is a vertical sectional view illustrating a service T embodying this invention connecting a service line with a main.

FIGURE 2 is an enlarged sectional view of the excessive-flow safety valve assembly shown in FIGURE 1.

FIGURE 3 is a view of the right hand end of the assembly shown in FIGURE 2.

FIGURE 4 is a fragmentary view corresponding to FIGURE 1, but showing a modified form of the invention.

Referring now to the drawings, there is shown a service T 10 having a T body 12 which is provided with a through bore 14 and a lateral outlet 16, the latter normally being surrounded by an exterior boss 18 to which is connected, as by welding 20, a service line 22. The T body 12, at one end of the through bore 14 which may be termed an inlet end 24, is secured, as by welding 26, to a street main 28, for example, a gas main. An opening 30 is formed in the wall of the main 28 in alignment with the T bore 14 in order to allow gas to flow from the main into the bore, and thence through the lateral outlet 16 into the service line 22. In the embodiment of the invention illustrated in the drawings, the opening 30 normally is formed, after the T body 12 is welded to the main 28, without the escape of gas to the atmosphere by appropriate drilling apparatus (not shown) secured to the other end of the T body 12, such apparatus including a drill (not shown) operable through the T bore 14. Such apparatus is well-known in the art so that no further description thereof is necessary here.

The upper or outer end of the T bore 14 is provided with interior threads 32, and such upper end of the bore normally is blocked by means of an exteriorly-threaded closure plug 34 engaged with the bore threads 32. Preferably, the engaged threads on the plug 34 and in the bore 14 taper downwardly, i.e., are iron pipe threads, so as to provide an effective seal between the bore and the plug when the latter is securely tightened in place. The outer end of the plug 34 is provided with an interiorly threaded socket 36, the rim of which is intersected by a transverse kerf 38, so that the plug can be connected to an appropriate tool (not shown) for inserting the plug into the T body 12, without the escape of fluid from the atmosphere by means of apparatus known in the art, after the aforedescribed main-drilling operation has been completed. The upper or outer end of the T body 12 also preferably is provided with exterior threads 40 with which are engaged the threads on a closure cap 42.

Between the inlet end 24 of the T 10 and the lateral outlet 16, the T bore 14 is provided with a short threaded section 44 in which is secured an excessive-flow safety valve assembly 46 of the type disclosed in the aforementioned patent to Jerman. The assembly 46 includes a tubular valve body 48 having exterior threads 50 engaged with the bore threads 44. Preferably, the engaged threads 44 and 50 taper downwardly, i.e., toward the inlet end of the bore 14, so as to provide a seal between the body 48 and the bore. The body 48 is provided with a longitudinal flow passage 52 extending therethrough and provided, adjacent its upper end, i.e., the end nearest the lateral outlet 16, with a downwardly facing shoulder constituting a valve seat 54. Seatable on the seat 54 is a ball valve 56, of magnetic material, e.g., steel, in order to shut off flow through the passage 52, and thus shut off flow from the main 28 to the service line 22. Disposed in the lower end of the flow passage 52, i.e., the end nearest the inlet end 24 of the T body 12, is a generally U-shaped permanent magnet 58 having the outer marginal edge portions of the arms thereof engaged against another downwardly-facing shoulder 60 formed in the passage 52. The magnet 58 is retained in such position in the passage 52 by an inturned flange 62 at the lower end of the valve body 48, such flange being formed by a crimping or spanning operation. The smaller transverse dimension of the magnet 58 is less than the diameter of the passage 52 thereat so as to permit the flow of fluid past the magnet.

The ball valve 56 is normally seated against the arms of the magnet 58, which constitute the two poles thereof, and is retained in such engagement by magnetic attractive force. It will be seen, however, that the ball valve 56 creates a restriction in the flow passage 52, so that when flow therethrough reaches a predetermined value there will be a pressure drop across the ball. When such pressure drop or differential creates a force on the ball 56 sufficient to overcome the attractive force of the magnet 58, the ball will be released from the latter and will be carried by the fluid flow into seating engagement with the valve seat 54. The ball 56 will be retained on the seat 54 by the resulting pressure differential across the ball caused by shutting off flow through the passage 52.

The upper end of the passage 52, i.e., the end nearest the T outlet 16, is provided with interior threads 64, and the rim of the upper end of the valve body 48 is provided with a transverse kerf 66. The threads 64 and kerf 66 enable the assembly 46 to be connected to the end of an appropriate tool (not shown), similar to that mentioned above for insertion of the closure plug 34, so that by the use of apparatus of the type previously mentioned, the assembly 46 can be installed in the T 10 without the escape of fluid from the main 28 to the atmosphere, after the aforedescribed main-drilling operation has been completed and before the installation of the closure plug 34 and cap 42.

Between the threaded section 44 of the T bore 14 and the lateral outlet 16 and preferably immediately adjacent such threaded section, the T body 12 is provided with an exterior circumferential groove 68. The groove 68 serves to weaken the body 12 sufficiently so that when the body is struck a fracturing blow above the groove, the body will fracture off along the line or in the plane of the groove. The resulting excessive escape of fluid to the atmosphere from the main 28 through the remaining part of the T body secured thereto will immediately operate the excessive-flow safety valve assembly 46 to shut off flow from the main. It will be seen that by reason of the weakening groove 68, the chances of fracturing the T body 12 at any point between the excessive-flow safety valve assembly 46 and the main 28 is greatly minimized, if not completely prevented. It also will be seen that even if the T body 12 is not fractured, excessive-flow therethrough caused by any situation, will automatically operate to shut off flow to the service line 22.

Once the ball valve 56 has been seated against the seat 54 by reason of excessive flow, the resulting pressure differential across such valve retains the same in engagement with its seat until such pressure differential is equalized to reset the assembly 46. This can be accomplished by appropriate repair of the service line 22 or correction of any other situation, except fracture of the T body 12, which resulted in the excessive flow and subsequent introduction into the service line, e.g., through the upper end of the T body 12, of fluid, such as air under pressure, sufficient to accomplish the necessary equalization of the differential pressure across the ball valve 56. On such equalization, the ball 56 will drop and be drawn back into its retaining engagement with the magnet 58.

Of course, the aforedescribed method of resetting the excessive-flow safety valve assembly 46 cannot be accomplished when the T 10 is fractured off at the groove 68. In such a situation, service will have to be re-established by connecting the main 28 with the line 22 by a new T installed at a different location on the main. By means of appropriate apparatus known in the art, however, the excessive flow safety valve assembly 46 can be unscrewed and removed from the remaining portion of the fractured off T body 12 still secured to the main 28, and a closure plug (not shown) screwed into such remaining portion in place of the assembly, all without the escape of fluid from the main to the atmosphere. A somewhat simpler procedure would be to simply weld a closure cap (not shown) over the top of the fractured-off T body without bothering to remove the assembly 46.

The invention also is adaptable to a plain service T that has no special provisions for fastening therein an excessive-flow safety valve assembly. Thus, referring to FIGURE 4, there is shown a plain service T 70 having its lower or inlet end 72 welded to a main 74. The bore 76 of the T 70, between its inlet end 72 and lateral outlet 78 is smooth-surfaced instead of being threaded as described above with reference to FIGURE 1. The T body 80, however, between the inlet end of the bore 76 and the lateral outlet 78, is provided with an exterior circumferential weakening groove 82 in the same manner as the T 10 shown in FIGURE 1.

After the T 70 has been welded to the main 74, the latter is drilled and tapped, through the use of an appropriate drilling and tapping tool, to form a threaded opening 84 therein in alignment with the T bore 76, instead of merely drilling a plain opening in the main in the manner previously described with regard to FIGURE 1.

Screwed into the tapped opening 84 in the main 74 is an excessive-flow safety valve asembly 86 substantially identical to that described above with regard to FIGURES 1 to 3. The valve body 88 of the assembly 86, however, is of a size that not only will pass through the bore 76 of the T 70 but also will mate with the threads in the tapped opening 84 in the main 74.

By means of the construction shown in FIGURE 4, the expense attendant the provision of interior threads in a service T, between its inlet end and outlet, is eliminated, and the T bore may, instead, be merely smooth-surfaced, as is the practice with plain service Ts. It will be seen, however, that the installation shown in FIGURE 4 will protect against excessive-flow for any cause including fracturing-off of the T 70 at its weakened portion 82.

Although the invention has been described with reference to a service T of the type that is welded to a main and service is established by subsequent drilling operations, it will be realized that the invention is equally applicable to a service T of the type that has exterior threads at its inlet end so that the T can be screwed into a tapped aperture in a main. This type of T, which is not shown in the drawings because it is well known in the art, is termed a machine-inserted service T. In a machine-inserted service T, it is not necessary that the excessive-flow safety valve assembly be constructed as a sub-assembly separate and removably from the T. Instead, the flow passage for the excessive-flow safety valve arrangement can be formed as an integral part of the bore of a machine-inserted service T. In other words, the valve body of the excessive-flow safety valve assembly, and the T body, can be integral. This arrangement is practical because in the event that a machine-inserted service T is fractured off, as aforedescribed, the remaining part of the T body still attached to the main can be unscrewed from the latter and the tapped opening in the main closed by an appropriate threaded closure plug, all without the escape of fluid from the main to the atmosphere by the use of apparatus known in the art. Alternatively, the remaining part of the T body still in the main can have a closure cap welded thereover.

The bodies of metal service T's usually are made of iron or steel, i.e., magnetic material. Consequently, the valve bodies of the assemblies 46 and 86, shown in FIGURES 1 and 4, respectively, should be made of a non-magnetic material, preferably brass. Alternatively, those bodies can be made of iron or steel and the magnets of those assemblies enclosed in a sleeve of nonmagnetic material, e.g., brass, aluminum, or even plastic. Such a sleeve would be used, of course, if the T and valve bodies shown in FIGURE 1 are made integral.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:
1. A service T comprising: a T body having a through bore and a lateral outlet, one end of said bore constituting an inlet; a tubular valve housing carried by said bore between said inlet and said lateral outlet and defining a valve seat facing said inlet; a valve element car- ried by said bore seatable on said seat to shut off flow between said inlet and said outlet; yieldable means in said housing inwardly of said seat normally retaining said element unseated and responsive to excessive flow past said element to release the latter for movement by the flow of fluid into seating engagement with said seat; and means defining a circumferentially weakened portion in said body between said seat and said outlet, whereby a fracturing blow to said T will fracture the same at said weakened portion and the resulting excessive flow will effect the seating of said valve element to shut off flow from said inlet to any location beyond said seat.

2. The structure defined in claim 1 in which the weakened portion is formed by an exterior circumferential groove.

3. The structure defined in claim 1 in which the valve element is of magnetic material and the yieldable means comprises a permanent magnet.

4. The structure defined in claim 1 in which said valve housing threadedly engages said bore and in which the engaged threads on the housing and in the bore taper toward the inlet to effect a seal between said housing and bore.

5. The structure defined in claim 4 in which the outer end of the valve housing is provided with threads other than those engaged with the bore and with a non-circular configuration, said threads and configuration being accessible from the other end of the bore and adapted for engagement by a housing-inserting tool.

References Cited in the file of this patent
UNITED STATES PATENTS

| | | |
|---|---|---|
| 733,372 | Colwell | July 14, 1903 |
| 2,281,781 | Merrill | May 5, 1942 |
| 2,569,316 | Jerman | Sept. 25, 1951 |
| 2,765,801 | Selim | Oct. 9, 1956 |